N. B. HURD.
PANIC BOLT MECHANISM.
APPLICATION FILED FEB. 29, 1916.
Reissued June 6, 1916. 14,147.
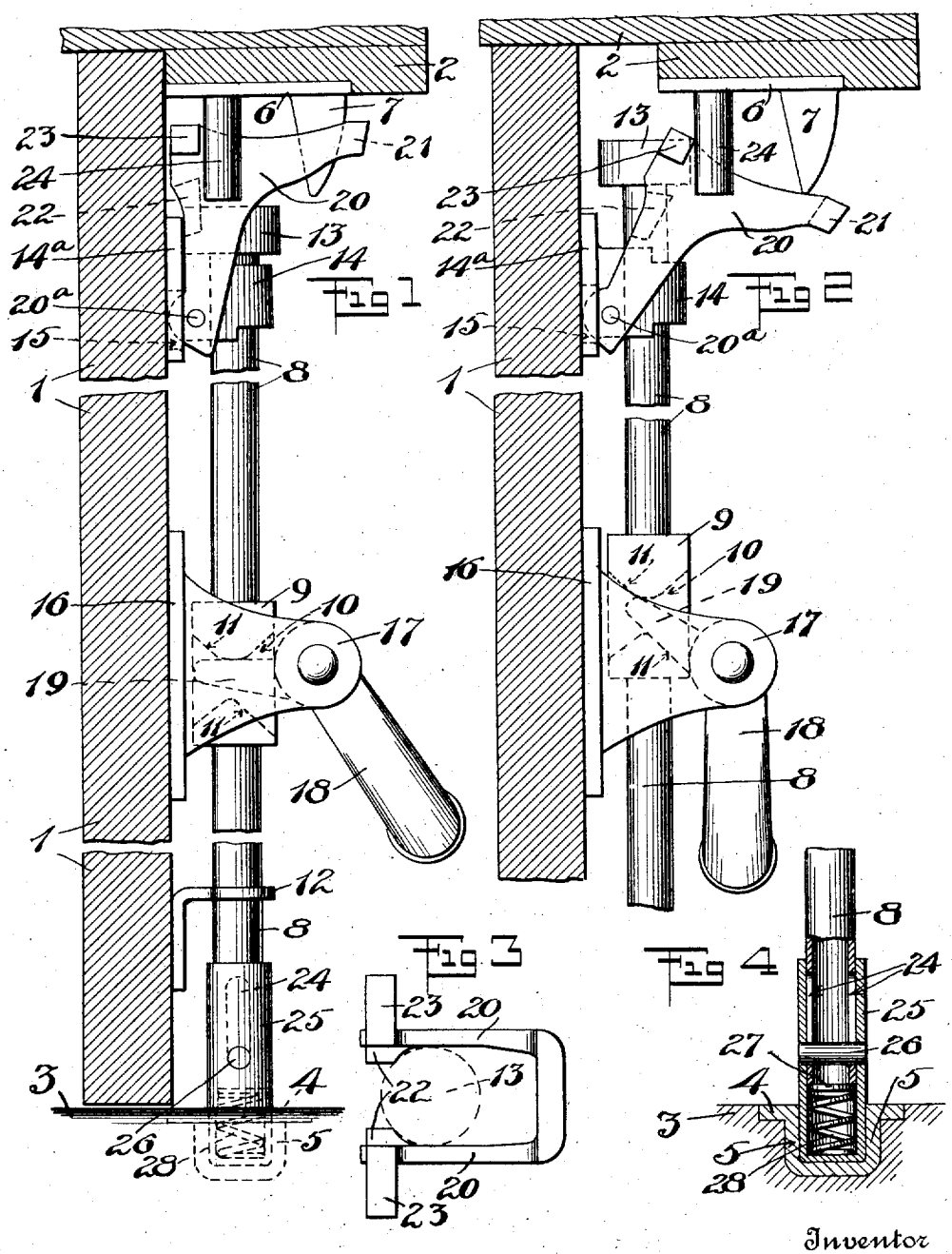
Inventor
Norman B. Hurd,
By his Attorneys
Mitchell & Allyn.
THE COLUMBIA PLANOGRAPH CO., WASHINGTON, D. C.

UNITED STATES PATENT OFFICE.

NORMAN B. HURD, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

PANIC-BOLT MECHANISM.

14,147. Specification of Reissued Letters Patent. Reissued June 6, 1916.

Original No. 1,145,590, dated July 6, 1915, Serial No. 1,901. Application for reissue filed February 29, 1916. Serial No. 81,275.

*To all whom it may concern:*

Be it known that I, NORMAN B. HURD, a citizen of the United States, residing at New Britain, Hartford county, Connecticut, have invented certain new and useful Improvements in Panic-Bolt Mechanism, of which the following is a full, clear, and exact description.

This invention relates to door locking mechanism comprising locking means carried by the door and controlling means associated therewith, said controlling means including a cross bar or the like so positioned on the door as to be engaged with certainty in the event of a panic and it becomes necessary to quickly release the locking mechanism so that the door may be opened.

My main object is to provide in a device of this general character latching means for the door, controlling means therefor, and means to hold the controlling means in the proper position to permit the latching means to stand retracted so long as the door is open.

Another object is to so construct and associate the various parts that it requires a predetermined movement of the operating device to release the door to which the door locking mechanism is applied.

These and other advantages will be fully understood by reference to the following description and the accompanying drawings which form part thereof, and which illustrate my invention in a preferred form.

In the drawing: Figure 1 is a vertical sectional view of a door and door casing showing my invention in elevation and in the door locked position. Fig. 2 is a similar view, the lower part being broken away, and showing the parts in the door opened position. Fig. 3 is a plan view of the upper latch bolt detached. Fig. 4 is a longitudinal sectional view of the lower bolt or latch and its keeper or socket.

1 represents a door, 2 part of the overhead casing, and 3 part of a floor.

8 is a bar carried at the inside of the door and movable in brackets 12—14 arranged near opposite ends thereof. In this instance the bar 8 is movable vertically. The middle part of the bar 8 has an enlargement 9 having a passage 10 or recess therein the upper and lower sides of which are preferably beveled as at 11 to provide suitable clearance for an arm 19 pivoted on a bracket 17 and operable by a cross bar 18 which is hinged to said bracket 17. The bracket 17 is secured to the door by its base 16.

In this particular construction, the locking mechanism includes two locking devices, one at the upper end of the bar 8 and another at the lower end thereof. I will first describe the one at the lower end.

25 is a bolt head having a limited sliding movement on the lower end of the rod 8.

24 is a slot in the rod. 26 is a pin carried by the head 25 passing through said slot.

27 is a stop shoulder or washer at the lower end of the rod 8.

28 is a spring bearing against the shoulder 27 and against the lower inner end of the bolt head 25 so as to normally project the same.

5 is a socket in the floor 3. 4 is the usual flange for said socket.

When the door is locked the bolt head 25 projects into the socket 5 and should said socket be partially filled with dirt or anything tending to prevent the full insertion of the head 25 into said socket, the spring 28 will allow the bolt head to yield.

The door locking mechanism adjacent the upper end of the bar 8 comprises a freely pivoted latch member which is unrestrained, that is to say, is not positively held against movement, excepting when in the projected or locking position. This latch member, in its preferred form, comprises two side bars 20—20 connected by a bar 21 at their upper ends.

14ª represents the base of the guide bracket 14.

The lower ends of the side bars 20—20 are pivoted at 20ª on opposite sides of the bracket 14 and the rear side of each arm adjacent to this pivotal point projects slightly into a recess 15 in the base 14ª so that when the latch member swings out to the position shown in Fig. 2 its lower end will strike against the shoulder at the bottom of the recess 15 which will thereby stop said latch member from further swinging movement, and hold it in the position shown in Fig. 2 although of course permitting it to swing freely from said position to the position shown in Fig. 1.

22—22 are inwardly projecting lugs formed on the side bars 20—20 intermediate the length thereof.

23—23 are outwardly projecting ears on the side bars 20—20.

The keeper in this instance is preferably constructed as follows: 7 is a downwardly projecting horn which forms an abutment shoulder which takes the strain of the latch when the door is locked. This keeper is carried by a suitable plate 6 which may be secured to the overhead casing 2. 24—24 are downwardly projecting abutment pins which are located in the path of movement of the ears 23—23 when the door is being closed. Hence, when the door is closing, and moves from the position shown in Fig. 2 to that shown in Fig. 1, the latch will be swung to the locking position. 13 is a head on the rod 8 which when the latch is in the locking position, holds the latch in said position. In this instance the head 13 stands directly in front of the lugs 22—22 as best seen in Fig. 3, and thus, so long as said head is in said position, the latch will be held against movement. If the cross bar 18 is pressed from the position shown in Fig. 1 to that shown in Fig. 2, which pressure is in the door opening direction, the rod 8 will be moved in a direction to move the head 13 upwardly. When this head 13 has moved sufficiently to clear the upper ends of the lugs 22—22, the latch is released and will drop to the position shown in Fig. 2, the lugs 22—22 moving to a position underneath the head 13, in which position they will block the descent of the bar 8. Thus, the latch performs a double function. In one position (Fig. 1) wherein it is projected, it is positively held and positively holds the door locked. In the other position, Fig. 2, wherein it is retracted, it is free to move but while it stands in said position it performs the function of holding the bar 8 elevated. Since the lower bolt or locking means is retracted when the bar 8 is elevated it follows that the upper latch serves as a means to hold the lower latch retracted so that it cannot be moved until the upper latch is projected.

In the present construction it requires a predetermined retractive movement of the manually operable means relatively to the locking bolt in order to release the latter so that the door may be opened, that is to say, the head 13 must always be moved to a point where it will free the latch before the latter can be freed from its keeper. This prevents the premature opening of the door. It is well known that substantial shrinkage frequently occurs between a door and a door casing and where the door is locked by a latch it is obvious that when this shrinkage occurs if the latch is retracted simultaneously with the operating means it will become freed from the keeper before the retracting means has been fully retracted. In the present construction this would be disadvantageous because unless a full movement is given to the retracting means, the latter will not be engaged and held in the retracted position while the door is open, and hence, the bolt or bolts would continue to project beyond the edge of the door and would be liable to cause damage. By my improvement this can never occur, because the manually operable means 18 and 8 must always be moved a predetermined distance before the upper latch will be released, and when said operating means is moved said predetermined distance, it guarantees the certain operation of the means which serves to hold the manually operable means in the door open position.

As explained at the outset, I have shown and described my invention in its preferred form, appreciating that many changes and modifications may be made therein without departing from the spirit and scope of my invention.

What I claim is:

1. A panic bolt mechanism for doors, including a latch bolt and a latch controlling bar carried by the door, manually operable means for moving said bar in latch withdrawing direction, an abutment stationary relative to the door and a combined door and bar latching means movable relatively to said door and coöperating with said abutment and said bar, respectively, to lock the door closed and to latch said bar in door open position, respectively.

2. A panic bolt mechanism for doors, including a latch bolt and a latch controlling bar carried by the door, manually operable means for moving said bar in latch withdrawing direction, an abutment stationary relative to the door, and a combined door and bar latching means movable relatively to said door and coöperating with said abutment and said bar, to lock the door closed and to latch said bar in door open position, and with other abutment means stationary relative to the door and coöperating with said latching means when the door is closed, whereby said latching means is moved to release said bar and to latch said door closed.

3. A panic bolt mechanism for doors, including a latch bolt and a latch controlling bar carried by the door, manually operable means for moving said bar in latch withdrawing direction, an abutment stationary relatively to the door, and combined door and bar latching means carried by and movable relatively to the door and coöperating with said abutment and said bar, respectively, to automatically lock the door closed, and to automatically latch said bar in manually moved position, respectively.

4. A panic bolt mechanism for doors, including a latch bolt and latch controlling bar carried by the door, manually operable means for moving said bar in latch withdrawing direction, an abutment stationary relatively to the door, and combined door and bar latching means carried by and movable relatively to the door and coöperating with said abutment and said bar, respectively, to automatically lock the door closed and to automatically latch said bar in manually moved position, respectively, there being other stationary abutment means coöperating with said latching means when the door reaches closed position, whereby said means is automatically moved to release said bar and to coöperate with said first abutment to lock the door closed.

5. A panic bolt mechanism for doors, including a latch bolt and a latch controlling bar carried by the door, manually operable means for moving said bar in latch withdrawing direction, an abutment stationary relative to the door, and a combined door and bar latching means carried by the door and movable relatively thereto and to said bar, said means engaging with said abutment and coöperating with said bar to lock the door closed, and being movable to release said abutment and latch said bar when the latter is moved and the door is moved toward open position.

6. A panic bolt mechanism for doors, including a latch bolt and a latch controlling bar carried by the door, manually operable means for moving said bar in latch withdrawing direction, an abutment stationary relative to the door, and a combined door and bar latching means carried by the door and movable relatively thereto and to said bar, said means engaging with said abutment and coöperating with said bar to lock the door closed and being movable to release said abutment and latch said bar when the latter is moved and the door is moved toward open position, and with other stationary abutment means coöperating with said latching means when the door is again closed to move said means to release said bar and to engage said first abutment to again lock the door.

7. A panic bolt mechanism for doors, including a latch bolt and a latch controlling bar carried by the door, manually operable means for moving said bar in latch withdrawing direction, an abutment stationary relative to the door, a combined door and bar latching member carried by the door independently of said bar and movable relative to said door and bar, said member when in one position, engaging with said abutment and said bar to lock said door closed and being movable by gravity into a second position when said bar is manually moved toward the open position to release said abutment and engage and hold said bar in latch withdrawn position, with another stationary abutment member coöperating with said latching member when the door is closed to move it to release said bar and to engage said first abutment to again lock the door closed.

8. A panic bolt mechanism for doors, including a latch bolt and latch controlling bar carried by the door and having an offset thereon, manually operable means for moving said bar in latch withdrawing direction, and abutment stationary relatively to the door, a combined door and bar latching member hingedly carried by the door independently of the bar and movable relative thereto, said member having a stop abutment thereon and being operative, in one position thereof, to engage with said stationary abutment to lock the door closed, said offset engaging said stop abutment and holding said latching member in such position, said member, when said bar is manually moved to latch withdrawing position and the door opened, moving by gravity to release said abutment and to engage its stop abutment with said offset and holds said bar in manually moved latch withdrawn position, and with a second stationary abutment positioned to engage and move said latching member, when the door is again closed, to release said bar and to again engage said first abutment.

9. A panic bolt mechanism for doors, including a bar carried by the door, manually operable means for moving said bar in one direction, an abutment stationary relative to the door, and a combined door and bar latching means carried by and movable relatively to said door and coöperating, in different positions thereof, with said abutment and said bar, respectively, to lock the door closed and to latch said bar in door open position, respectively.

10. A panic bolt mechanism for doors, including a bar carried by the door, manually operable means for moving said bar in one direction, an abutment stationary relative to the door, and a combined door and bar latching means carried by and movable relatively to said door and coöperating, in different positions thereof, with said abutment and said bar, respectively, to lock the door closed and to latch said bar in door open position, respectively, and with other abutment means stationary relative to the door and coöperating with said latching means when the door is closed, whereby said latching means is moved to release said bar and to latch said door closed.

11. A panic bolt mechanism for doors, including a latch controlling bar carried by the door, manually operable means for moving said bar in one direction, an abutment stationary relatively to the door, and combined door and bar latching means carried by and movable relatively to the door and coöperating with said abutment and said bar, respectively, to automatically lock the door closed and to automatically latch said bar in door open position, respectively, there being other abutment means coöperating with said latching means, when the door reaches closed position, whereby said means is automatically moved to release said bar and to coöperate with said first abutment to lock the door closed.

12. In a door bolt mechanism, a latch receiving abutment face arranged to be carried by a door casing, a swinging latch arranged to be carried by a door and to engage said abutment face, said latch being permitted to assume an unlocking position when unrestrained, another abutment face also arranged to be carried by the door casing to engage said latch to move it to the locking position when the door is closed, a manually operable means arranged to be carried by the door to hold said latch in the locking position when said door is closed and when said means is in one position, said latch being unrestrained and free to move when said means is in another position.

13. In a door bolt mechanism, a latch receiving abutment face arranged to be carried by a door casing, a swinging latch arranged to be carried by a door and to engage said abutment face, said latch being permitted to assume an unlocking position when unrestrained, another abutment face also arranged to be carried by the door casing to engage said latch to move it to the locking position when the door is closed, a manually operable means arranged to be carried by the door to hold said latch in the locking position when said door is closed and when said means is in one position, said latch being unrestrained and free to move when said means is in another position, said means comprising a bar with brackets for carrying said bar on a door, one end of said bar having a telescopic spring-projected bolt head slidable on the bar and supported thereby.

14. In a door bolting means of the character described, in combination with a door and a door casing, two bolts, one adapted to engage a keeper on the floor, the other adapted to engage a keeper on the casing, one of said bolts being freely pivoted to the door, means on the casing to engage the latter bolt to move it into position to engage its keeper, independently movable manually operable means for controlling said bolts, said means operating to hold both of said bolts projected and to hold only one of said bolts retracted, the last mentioned bolt coöperating with said manually operable means to hold the same in its bolt retracted position when said last mentioned bolt stands retracted.

15. In a door bolting means of the character described, in combination, a door and door casing, a bar slidable vertically on the inner face of the door, a bolt for the lower part of the door operable by said bar, another bolt independent of said bar for the upper edge of the door, both of said bolts being adapted to engage an adjacent part of the door casing, one of said bolts coöperating with the bar to hold the same in the unlocking position when the door stands open.

16. In a door bolting means of the character described, a bolt member, an independent manually operable means to hold said bolt projected, a keeper for said bolt, means requiring said manually operable means to be moved a predetermined distance relatively to said bolt before the latter can move in a direction to be released from the keeper, and means to automatically engage and hold said manually operable means in the door open position when said bolt is released.

17. In a door bolting means of the character described, in combination with a door and its casing, of two bolts, a keeper on said casing, one of said bolts being arranged to engage said keeper, independent manually operable means for controlling said bolt to hold the same in engagement with said keeper when said means stand in one position, with means coöperating with the manually operable means to require a predetermined movement thereof relatively to the bolt to release the latter from said keeper and with means to automatically engage and hold said manually operable means in the last mentioned position while said bolt stands in the non-engaging position relatively to said keeper.

18. In a door bolting means of the character described, in combination with a door and its casing, of two bolts, a keeper on said casing, one of said bolts being arranged to engage said keeper, independent manually operable means for controlling said bolt to hold the same in engagement with said keeper when said means stand in one position, with means coöperating with said manually operable means to require a predetermined movement thereof relatively to the bolt to release the latter from said keeper, and with means to automatically engage and hold said manually operable means in the last mentioned position while said bolt stands in the non-engaging position relatively to said keeper, the other bolt being held retracted by said manually operable means at such time.

19. In a door bolting means of the character described, in combination, a door and door casing, a keeper on the casing, a bolt on the door arranged to engage said keeper, manually operable bolt controlling means independent of but coöperating with said bolt and arranged whereby a predetermined movement of said controlling means relatively to said bolt is required before said bolt can move in a direction to be disengaged from the keeper, and means to automatically engage and hold said controlling means in the door open position, operable simultaneously with the initial movement of the bolt in the unlocking direction.

20. In a door bolting means of the character described, in combination, a door and door casing, a keeper on the casing, a bolt on the door arranged to engage said keeper, manually operable bolt controlling means independent of but coöperating with said bolt all arranged whereby a predetermined movement of said means relatively to said keeper is required to release said bolt from said keeper, and with means to automatically engage and hold said operating means in the last mentioned position while said bolt stands in the non-engaging position relatively to said keeper.

21. In a door bolting means of the character described, in combination, a door and door casing, a keeper on the casing, a bolt on the door arranged to engage said keeper, independent manually operable bolt controlling means coöperating with said bolt all arranged whereby a predetermined movement of said operating means relatively to said bolt is required before said bolt can be released from said keeper and the door opened, said manually operable means being automatically engaged and held in the last mentioned position while said bolt stands in the non-engaging position relatively to said keeper, and a second bolt controlled by said manually operable means and connected therewith.

22. In a door bolting means of the character described, a movable bolt, means to automatically project the same to the locking position upon the closing of the door by which it is carried, independent manually operable means for holding said latch bolt projected into said locking position, said means when projected to a predetermined extent relatively to said bolt releasing the latter to permit it to move to its unlocked position, said latch when in its unlocked position coöperating with said manually operable means to hold the same in its projected position.

23. In a door bolting means of the character described, a swinging bolt mounted on the door and arranged to engage a keeper mounted on the door casing, part of said latch bolt being arranged to strike against said casing on the closing movement of the door to automatically move said bolt into its locking position, a manually operable means carried by the door independently of said bolt and movable independently thereof and arranged to hold said bolt in its locking position when said manually operable means is in one position, and to free said latch bolt when said means is in another position, said bolt coöperating with said means to hold the same in the last mentioned position when said bolt stands in the unlocking position.

24. In a door bolting means of the character described, a bolt member, an independent manually operable means to hold said bolt projected, a keeper for said bolt and means requiring said manually operable means to be moved a predetermined distance relatively to said bolt before the same can be moved in a direction to be disengaged from said keeper, and means controlled by said latch to automatically engage and hold said manually operable means retracted when said bolt is released, said means operating to engage said manually operable means on the first part of the movement of the bolt in an unlocking direction.

NORMAN B. HURD.

Witnesses:
H. A. TAYLOR,
H. M. DALSON.

Copies of this patent may be obtained for five cents each, by addressing the "Commissioner of Patents, Washington, D. C."